United States Patent

[11] 3,571,575

| [72] | Inventors | John Denzil Barr<br>Oadby, Leicester;<br>Peter Frederic Thomas Cryer Stillwell,<br>Aldershot, England |
|---|---|---|
| [21] | Appl. No. | 649,603 |
| [22] | Filed | June 28, 1967 |
| [45] | Patented | Mar. 23, 1971 |
| [73] | Assignee | The Rank Organisation Limited<br>London, England |

[54] MEASUREMENT DEVICES
3 Claims, 4 Drawing Figs.

[52] U.S. Cl............................................. 235/92,
356/106
[51] Int. Cl.....................................G06m 1/272,
G06m 3/14
[50] Field of Search........................................ 235/92
(55), (66), (28), (29D), (70), (74)

[56] References Cited
UNITED STATES PATENTS
3,304,415  2/1967  Connolly..................... 235/92

| 3,414,718 | 12/1968 | McElroy...................... | 235/92 |
| 2,954,266 | 9/1960 | Danielson.................... | 346/33 |
| 3,209,130 | 10/1965 | Schmidt....................... | 235/92 |
| 2,604,004 | 7/1952 | Root............................ | 88/14 |

*Primary Examiner*—Maynard R. Wilbur
*Assistant Examiner*—Robert F. Gnuse
*Attorney*—Griffin, Branigan & Kindness

ABSTRACT: An electronic counter is provided for use in counting pulses, for example pulses representing interference fringes in laser interferometers. In order to give an output reading in a predetermined scale of measurement, for example, the metric system the pulses are counted in a first counter and pass through a gate to a second counter which gives the output reading, the gate being controlled in dependence upon the first counter so that the gate is blocked, for the duration of one input pulse, at predetermined intervals, such that the count in the second counter is modified by a predetermined ratio to give an output count in the desired scale of measurement.

PRESSURE COMPENSATED INCH MEASURING SYSTEM

MEASUREMENT DEVICES

The present invention concerns electronic counters and is particularly but not exclusively concerned with electronic counters for use in association with laser interferometers.

A laser can be arranged to provide a coherent beam of light, and, if the laser is constrained to operate in a single mode, interference fringes can be obtained over long distances. The laser can be used as the source of light in an interferometer so that motion of the reflecting surface of a mirror can be detected. Such an arrangement is described in our copending British Pat. application No. 28057/65. It is possible to arrange to detect the direction of motion of the mirror by making use of the polarizing properties of light waves, and consequently it is finally possible by using a reversible electronic counter to display continuously a number representative of the position of the mirror. A number of instruments have been made in which this is done, and the simplest instruments display the mirror position as the number of half wavelengths through which the mirror has been moved from a datum. More complex instruments have been made in which the wavelength count is converted into engineering measure by means of a small digital computer.

It is an object of this invention to show how this conversion from a wavelength count into engineering units can be accomplished with good accuracy and without need for digital multiplication. It is a further object of the present invention to provide an electronic counter designed to give a reading in one scale of measurement, for example, in inches which can be readily converted to give readings in a second scale of measurement, for example, the metric system.

According to the present invention, there is provided an electronic counter comprising first counter means responsive to input signals representative of one scale of measurement and arranged to modify said input signals in accordance with a predetermined ratio to provide modified signals, and second counter means responsive to said modified signals to give an output reading which is in a second scale of measurement.

The first counter means may control the path of input signals to said second counter means according to the operation of input signals on said first counter means.

The output of the first counter means may be arranged to control a gate so as to block the input to said second counter means at predetermined intervals during the count, thus modifying the input signal to said second counter means by the predetermined ratio. The first counter means may include a plurality of stages, each of said stages being arranged to provide a separate correction to said input signals, the cumulative total of said corrections constituting the required modification of said input signals, and said first counter means may be arranged to vary their capacity in accordance with changes in a parameter, for example atmospheric pressure of temperature.

The invention includes an interferometer counter for measuring the number of interference fringes produced by the movement of a target, comprising first counter means connected to decoding means which each control the operation of a gate in association with a directional signal, the output of said gate controlling the operation of a further gate interposed between input means and second counter means, whereby a predetermined proportion of input pulses are omitted from the input to said second counter.

The counter may include circuit means for modifying the input to said second counter means so that the output of said second counter means can give a reading in a third scale of measurement. The circuit means may include at least one counter means receiving said modified signal and connected to at least two further counter means arranged in parallel, the outputs of said further counter means being taken through suitable delay lines to an OR gate in the input to said second counter means.

Embodiments of counters according to the present invention will now be particularly described hereinafter by way of example and with reference to the accompanying drawings, in which.

Figure 1:
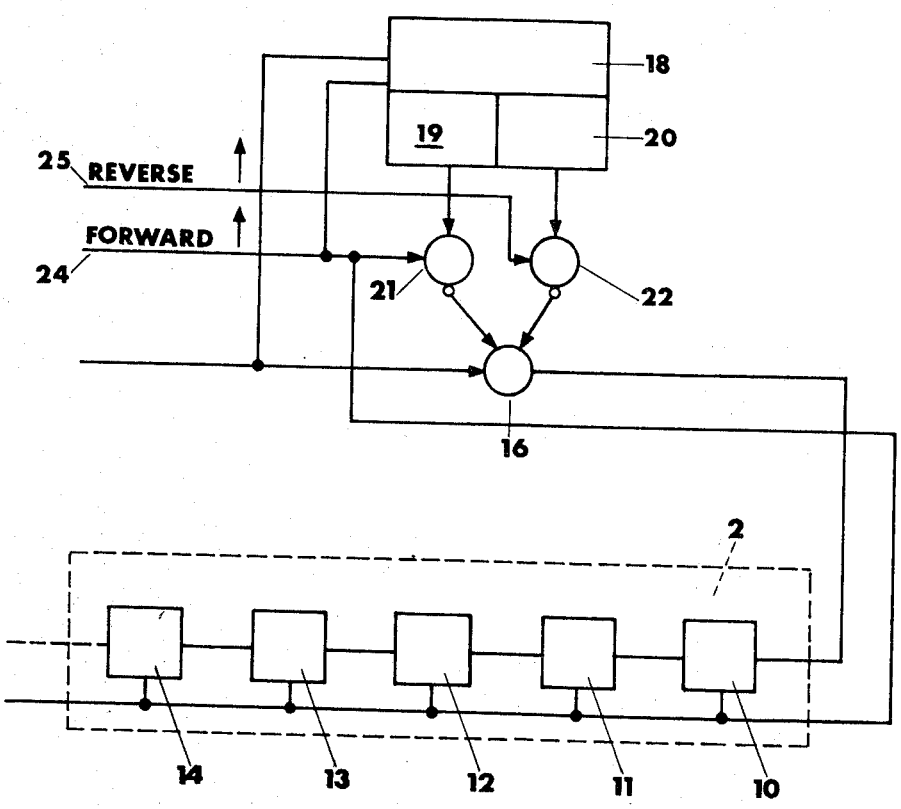
FIG 1 is a circuit diagram of one embodiment of an electronic counter for use with the fringe count of an interferometer.

Referring to FIG. 1 of the drawings, a counter is provided for operation with a Helium Neon laser interferometer, not shown, which may be similar to the one described in our British Pat. application No. 28057/65.

The interferometer produces interference fringes, which in turn produce a train of pulses, the number of which is an indication of the distance through which a target has moved, and the counter is required to convert and show this number of pulses in units of ten-thousandths of an inch.

The counter comprises three binary stages 10, 11, and 12, followed by a plurality of decades 13, 14. The decade 13 is arranged to indicate digits, the decade 14 tens, and the following decades hundreds and thousands of units of one ten-thousandth of an inch. The wavelength of the laser light source in air at standard temperature and pressure, hereinafter referred to as S.T.P., is 24.914034 microinches, and the train of pulses required to be counted consists of one pulse per half wave the target of the interferometer has moved through. Two pulses therefore indicate one wavelength. These pulses are supplied, by way of an AND gate 16, the purpose of which will become apparent later on, to the binary stages 10, 11 and 12.

When the binary stage 10 has received two pulses, it will have unit output representing 24.914034 microinches. Similarly unit output of the binary stage 11 will represent 49.828068 microinches, and that of binary stage 12 will represent 99.656136 microinches.

It is desired to make the output of the third binary stage 12 which is the input to the first decade 13, measure ten-thousandths of an inch, so it is necessary to make the total count equal to 80,000 at a distance of 1 inch, because if an input of 80,000 pulses represented 1 inch, each pulse produced by the binary stage 12 would represent one ten-thousandth of an inch. The actual number of half wavelengths in 1 inch can be assessed by division and the number is almost exactly 80,276, more nearly 80,276.04.

To achieve correction the counter must register 80,000, when the total input has in fact been 80,276, thus 276 counts in 80,276 must be eliminated at the input, which means that one count in every $$\frac{80276}{276} = 290.813$$

counts must be eliminated.

In order to achieve this elimination a branch circuit is interposed between the input and the AND gate 16. The branch circuit comprises a reversible counter 18 having a capacity of 291 integers, connected respectively to a first decoder 19 and to a second decoder 20. These two decoders, which are devices arranged to change their state respectively at 290 and at 0, are in turn connected to NAND gates 21 and 22, that is to say gates which give a negative output when both inputs are positive. If either input is negative, the output of the gate is positive, using the conventions of positive logic. The outputs of the gates 21 and 22 are applied to the gate 16. A "forward" line 24 is connected to all the counters 10, 11, 12, 13, 14 and 18 and also to the gate 21, while a "reverse" line 25 is connected to the gate 22.

The logic of this circuit arrangement is primarily positive. Assuming an input count starting from zero and counting forward, the forward signal on the forward line 24 is UP, as indicated by the arrow, so that one input of the NAND gate 21 is UP, but the other input from the decoder 19 is DOWN. Consequently the output of the gate 21 is positive. Similarly the output of the gate 22 will be positive because the signal on the reverse line 25 will be negative. For every input count registering in the counter 18 there is a similar input count applied to the AND gate 16 and a corresponding input count to the binary stage 10.

Figure 2:
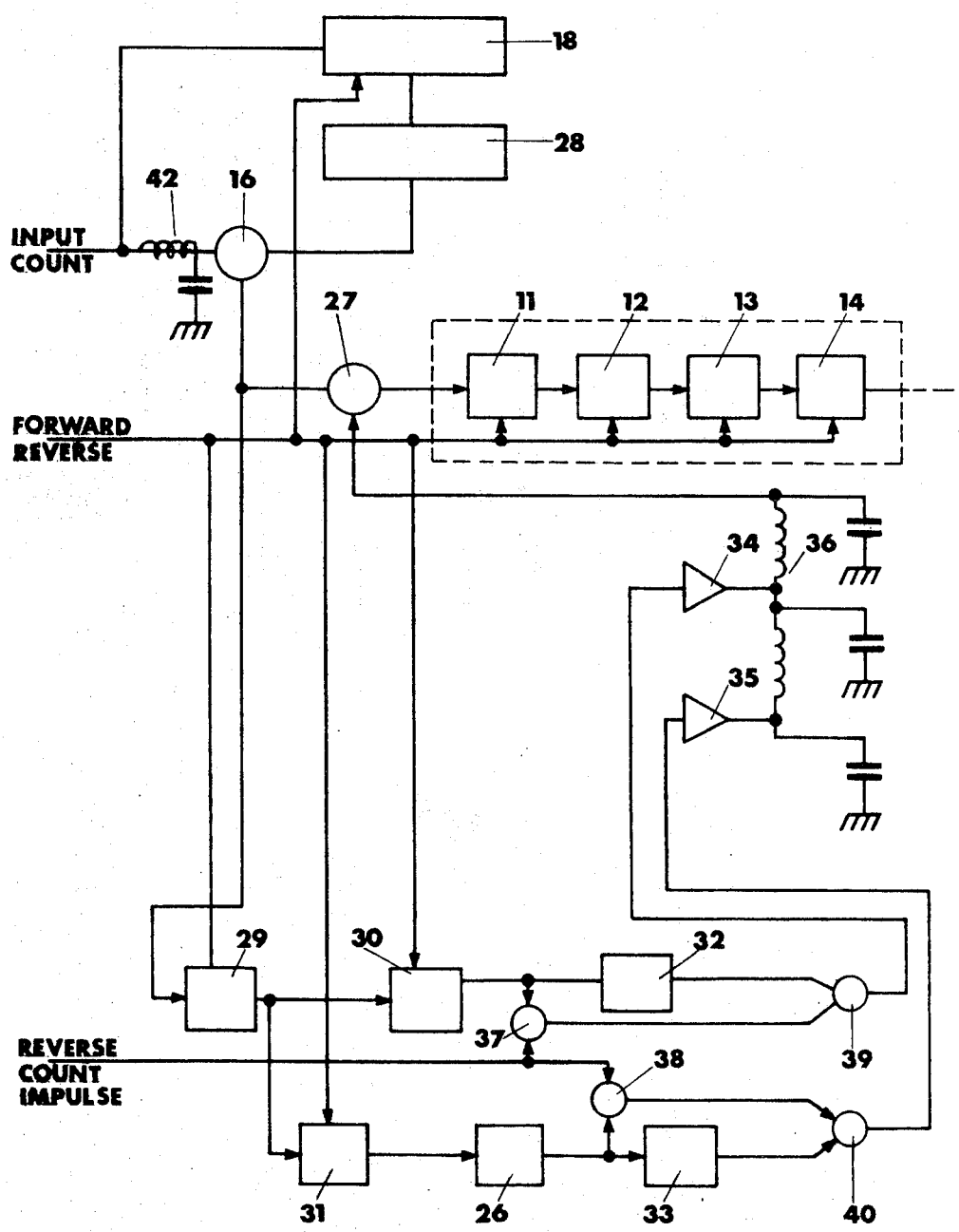
FIG. 2 is a circuit diagram of a second embodiment, arranged to provide a readout in the metric scale of measurement.

When the 291st count is applied, the output of the decoder 19 goes positive, and, because the input from the forward line 24 is still positive, the output of the NAND gate 21 will go negative. The propagation time of an incident input signal to the AND gate 16 must be long enough to ensure that the input signal operates the counter 18 and the decoders 19, 20 before reaching the gate 16. Thus, the 291st forward count pulse sets the decoder 19 (decoding 0) and sets the NAND gate 21 output negative before the 291st forward pulse reaches the AND gate 16, so effectively blocking the 291st pulse from entering the main counter 2. As shown in FIG. 2 at 42 a delay device would normally be used to provide sufficient propogation time, and normally has a delay slightly exceeding the total propogation time of the logic represented by the counter 18, decoders 19, 20 and the gates 21, 22.

Similar considerations apply when the counter is operating in the reverse direction when the decoder 20 (decoding 290) and the NAND gate 22 are operative.

A particular case of interest is when the counter just reaches 291 and then reverses; in this case it does not drop a pulse either in the forward or in the reverse direction. If, on the other hand, it counts forward from 290 to 0 it drops a pulse, the 0 pulse, and if it reverses from 0 to 290 it also drops a pulse, the 290 pulse. The omission of the pulse is associated with the actual transition.

The wavelength of the laser source depends upon pressure so that it is useful to have a similar method for a system in which the measuring beam is in vacuum. In this event the half wavelength is 12.4604606 microinches and the contents of the fourth counter are units of 99.6836848 microinches. The actual number of half waves in 1 inch is 80,253.8551 and consequently here we must eliminate $$\frac{80,253.855}{253.855} = 316.140.$$

Thus in the instrument with a vacuum path the parallel counter must have a capacity of 316 and the error is 0.14 half waves per inch or approximately 174 microinches at 100 inches.

It will be evident that if the wavelength of the interferometer light source is known a simple correction of the type described can always be applied so that the maximum error at 1 inch is not more than one-fourth of a wavelength or about 6 microinches. In the particular examples of S.T.P. and a vacuum path considerably better conversions can be obtained. At particular pressures the method can provide measurement correct to within one-half wavelength.

The embodiment described above enables a fringe count to provide a decade output in inches. It may be necessary to have a metric instrument, and it is then necessary to introduce a multiplying factor of 2.54. This can be achieved by modifying the input to the binary stage 10 so that for each input count 2.54 counts are registered: then the first decade will register not ten-thousandths of inches, but ten-thousandths of centimeters.

An embodiment capable of doing this is shown in FIG. 2. The input count is fed to the main counting chain 11 to 14 via an AND gate 16 and an OR gate 27. The chain now consists of two binary stages 11 and 12 followed by decades 13 and 14. The AND gate 16 is associated with an identical correction circuit to that of the electronic counter of FIG. 1 with the decoders and gates generally indicated by the reference numeral 28. Consequently the impulses emerging from the AND gate 16 are correct for feeding into a "three binary followed by a decade" counter for inches, as in FIG. 1. To produce a metric counter it must be arranged that each pulse issuing from the AND gate 16 in effect counts 2.54 pulses as far as the indicating decades 6 are concerned. To do this the pulses are passed from the AND gate 16 directly through an OR gate 27 to drive the first of the two binary stages 11 and 12; this ensures that two is counted for each pulse, or rather two times what would have been counted in the inch counter of FIG. 1. Next the pulses are taken from the AND gate 16 and divided by two in a counter 29. The output of this divider counter 29 drives two further counters 30 and 31 which respectively divide by two and divide by 25, the counter 31 being connected to a decoder 26. Their purpose in an undirectional count is to add in one pulse for every four input pulses and one pulse for every 50 input pulses respectively.

The logic associated with these counters 29, 30 and 31 is necessary because the counters are reversible. The inputs from the count sensing apparatus, are the count impulses, a forward reverse signal, and a forward reverse impulse. The latter is an impulse generated each time the sense of the count reverses and is slightly delayed relative to the forward reverse signal. Suppose now that the counter is counting forward in a normal manner, the output of the divide by four and divide by 50 chains trigger monostables 32 and 33 every fourth and 50th input count. The outputs from these monostables 32 and 33 are amplified at 34 and 35 and inserted into the main counter via the OR gate 27. The diagrammatic delay line 36 shown in FIG. 2 indicates that care must be taken to ensure that the outputs from the monostables 32 and 33 do not interfere when they occur simultaneously, as they will at every hundred counts. Two AND gates 37 and 38, and two OR gates 39 and 40 are provided to apply the reverse count impulse.

Assuming that the count has reached 100, both monostables 32 and 33 will have fired, thus inserting two forward count impulses into the main counter.

Suppose the sense of count now reverses. It is now necessary to subtract these two impulses from the main counter, and this can be done by inserting two further impulses into the main counter because the sense of the count has been reversed. In the embodiment shown in FIG. 2 this is arranged by gating the reverse count impulse with the output of the divide by four stage and the output from the decoded 25 stage in the AND gates 37 and 38. Thus, should the count in the correction circuit lie at 100 and any number of reversals take place, the logic ensures that when the count changes to either 99 or 1 in the correction circuit the contents of the main counter 11 to 14 are correct.

In FIG. 2 a delay device 42 is inserted between the branch from the input count and the AND gate 16. This is necessary because the counters are all reversible. It follows that the $N^{th}$ input pulse must not be counted, N being a multiple of the capacity of the counter 18. If no delay is present the decoder 28 could well block the (N+1) th pulse and if reversal took place at N the (N−$\mu$− 1) th which would prevent the counter from operating properly. The circuit is correct if the decoder 28 is always arranged to block the $N^{th}$ pulse into the main counter and a delay in the main count to the AND gate 16 will ensure this.

Figure 3:
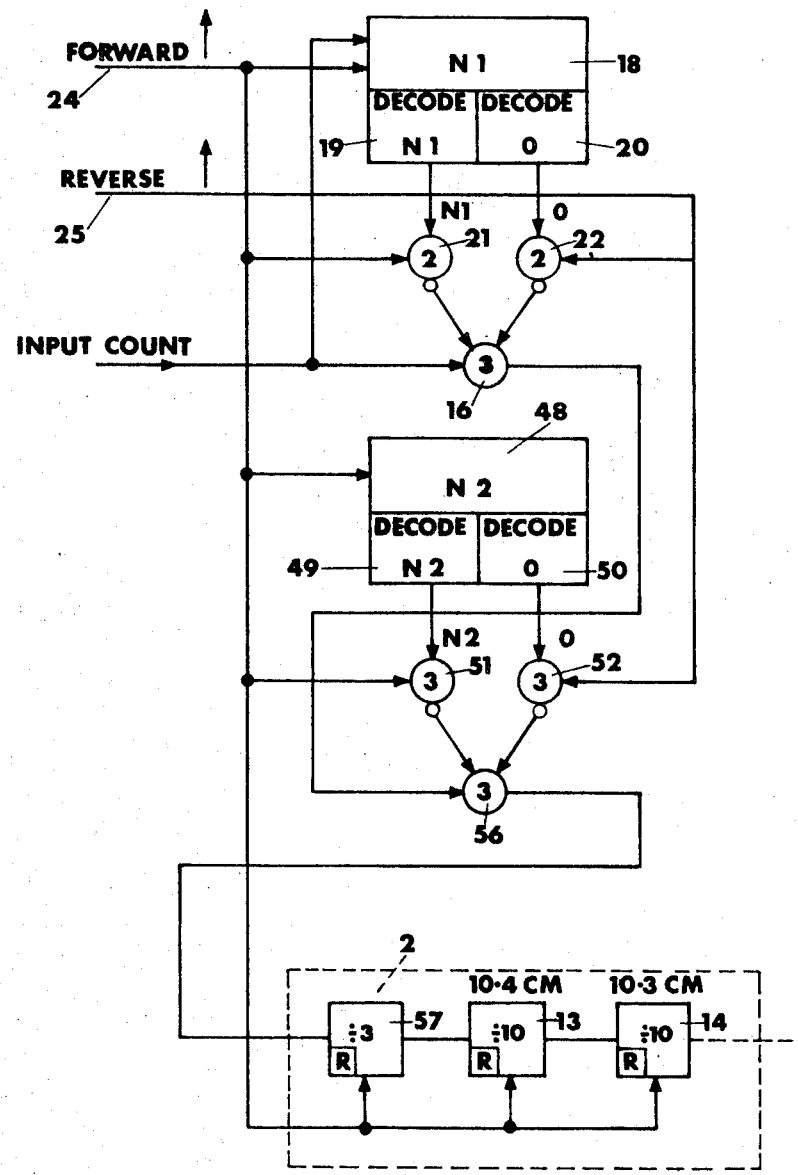
FIG. 3 is a circuit diagram of a third embodiment arranged to provide compensation for variations in atmospheric pressure.

Turning now to FIG. 3 of the drawings, this illustrates an embodiment representing a different modification of the correction described with reference to FIG. 1, for the purpose of providing a measurement in ten-thousandths of a centimeter.

In this embodiment, a first branch circuit 18 to 22 of the kind shown in FIG. 1 is linked with a second branch circuit having corresponding elements. These are a reversible counter 48, decoders 9 and 50, NAND gates 51 and 52, and an AND gate 56. Forward and reverse lines 24 and 25 control the various elements as in previous embodiments. The main counter 2, again shown in broken lines, comprises a divide by three reversible counter 57, the output of which is applied to a series of decades 13 and 14.

The operation of the counter is determined by the following considerations. The half wavelength of the laser source at S.T.P. is 12.457017 microinches or 0.31640823 microns. The counter 2 will read correctly if one centimeter is represented by 30,000 pulses applied to it, since the counter 57 divides by three, and each pulse produced by it then represents one ten-thousandth of a centimeter However, one centimeter is represented by 31,604.76 counts In order to provide an appropriate correction, it will be necessary to omit one count in every $$\frac{31604.76}{1604.76} = 19.694 \text{ counts.}$$

The first branch circuit 18 to 22 is arranged to omit one in every 20 counts in the way already described with reference to FIG. 1 The result of this is to cause one centimeter to be represented by 30,024.5 pulses out of the AND gate 16, and a further correction is applied in the second branch circuit 48 to 52. A further pulse has to be omitted for every 30,024.5/24.5 pulses, that is every 1,225.5 pulses. The capacity of the counter therefore is made equal to 1,226, and the result is an accuracy of a maximum error in the actual counter 2 of two parts in ten million.

In measurements of the order of precision with which the present invention is concerned, changes in atmospheric pressure or other ambient conditions may play an important part in affecting the accuracy of the results achieved. For example, the refractive index of air at S.T.P. is 1.00027644, and the wavelength of the laser beam is 24.914044 microinches. The maximum pressure variation in the British Isles is 80 mm. of mercury. It is assumed that this is a variation about a median value of 760 mm. and that compensation is required between 720 and 800 mm. The wavelengths at the three pressures will be 6328,257, 6328,164 and 6328,073 A. respectively. Since the system depends upon dropping pulses it is advantageous to choose a system for the shortest wavelength and to compensate for the longer wavelengths.

Figure 4:
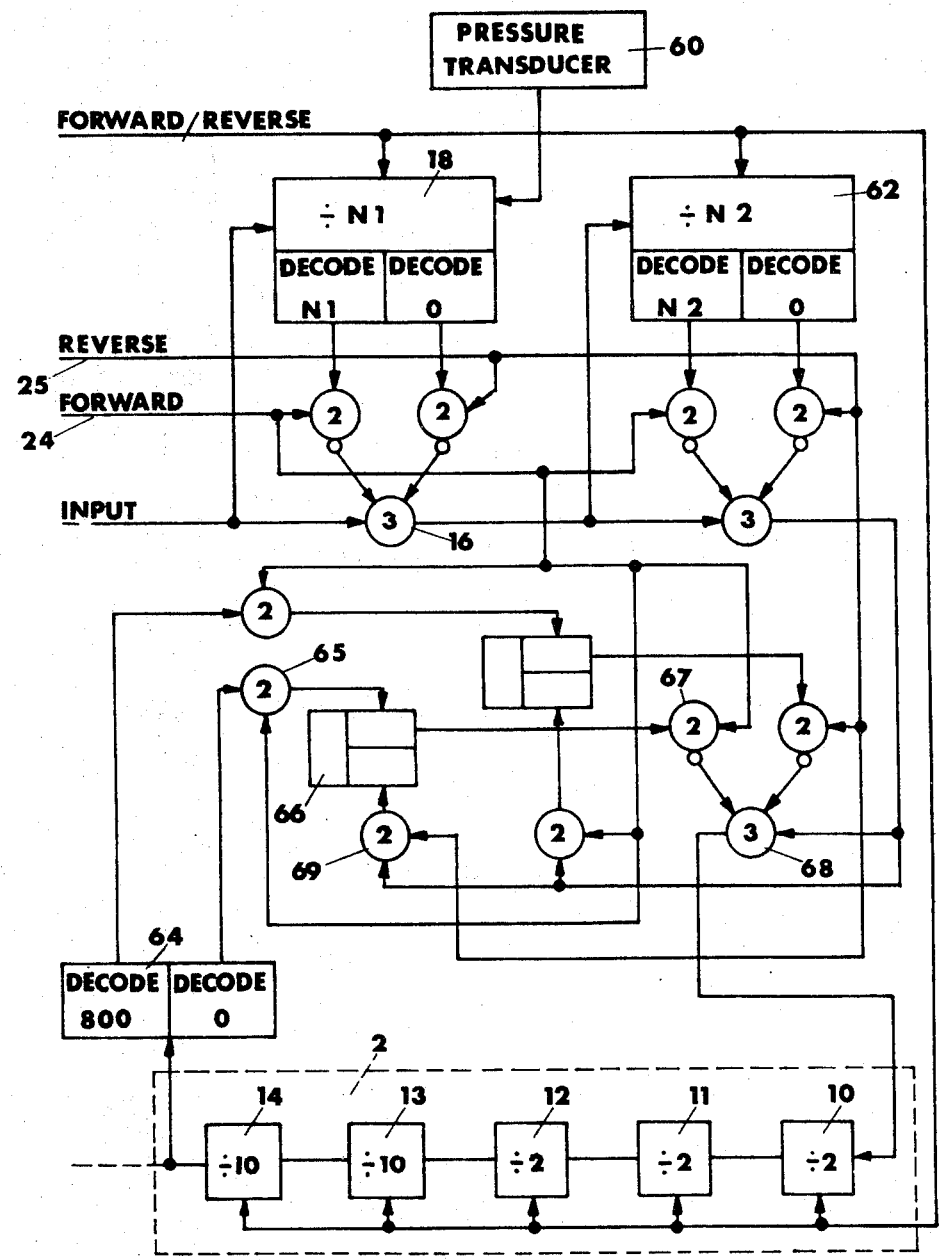
FIG. 4 is a circuit diagram of a fourth embodiment, also arranged to provide a readout in the metric scale, but according to a different principle from that used in the counter shown in FIG. 2.

A counter arranged to provide the desired compensation is shown in FIG. 4, and its construction and operation depend on the following considerations.

First, translating the wavelengths into units of measurement, these are:

| Pressure | Wavelength, A. | Unit ×10⁻⁶ in. |
| --- | --- | --- |
| 720 | 6,328,257 | 12.45720 |
| 760 | 6,328,164 | 12.45702 |
| 800 | 6,328,073 | 12.45684 |

Consider an inch counter as in FIG. 1 operating at the shortest wavelength. It is intended to correct for pressure, and it is intended to perform the correction in three parts.

For this purpose a counter corrector is provided so that the number at which a count is dropped is set by a transducer 60, see FIG. 4, measuring atmospheric pressure. Over the range of pressure 720 to 800 mm. of mercury the intention is to correct in 2.5 mm. steps. This correction is achieved by arranging a counter having a capacity of 1052 at 760 mm., 1068 at 720 mm. and 1036 at 800 mm. It will be noted that the capacity has to change by one for every 2.5 mm. change in pressure.

The effect of this correction can be readily calculated from the figures in the table above, and a new table is as follows:

| Pressure | N | Unit ×10⁻⁶ in. |
| --- | --- | --- |
| 720 | 1,068 | 12.468875 |
| 760 | 1,052 | 12.468874 |
| 800 | 1,036 | 12.468875 |

Taking the mean of the above units, that is 12.468874, and correcting for this, it becomes apparent that a second correction stage 62 requires an omission of one in every 402 counts. This gives a unit of measurement of 99.999744, which still shows an error of 3 in 10⁻⁶ inches. A correction for this can be achieved by adding yet another stage 64 of capacity 333,000, and the error at 760 mm. is then less than one part in ten million.

It will be appreciated that the capacities of the second and third correction stages 62 and 64 can be selected to be different numbers from those mentioned above, and there is no need to perform the major part of the correction with the stage 62 as previously described. For instance when the capacity of the second stage 62 is 500 and that of the third stage 64 is 2035, this will provide an equally satisfactory result. In the particular example of an inch counter as already described with reference to FIG. 1, there exists a division by eight in the main counting chain by the binary stages 10, 11, 12, there is an advantage in choosing the capacity of the stage 64 to be 800, for then, with a little subsidiary logic, the main counter can be arranged to provide the counting for it. It is found that in this example the capacity of the stage 62 is required to be 805.

Referring to FIG. 4, the first two stages 18 and 62 are arranged in the normal way, and the counter 18 is arranged to be controlled by a transducer 60 measuring atmospheric pressure. The capacity of the counter 62 is set at 805 and the counter 64 is arranged to use stages of the main counter 10 to 14.

The operation of the arrangement is as follows.

Supposing 800 is decoded from the first stages 10 to 12 of the main counter 2 and the counter 2 is counting forward. The AND gate 65 is activated and this sets a bistable 66. If the count continues the next pulse is omitted since the NAND gate 67 is held open by the output of the bistable 66 and this prevents the input pulse passing through the AND gate 68. It is assumed that there is some delay in the reset path to the bistable 66 so that, although this pulse is omitted from the count, it does reset the bistable 66. It can also be reset by a 'reverse' signal on the reverse line 25. This is necessary because if the counter 2 counts forward to 800, thereby setting the bistable 66 to omit the next pulse, and the counter 2 reverses, it is then essential not to omit a pulse from the count. The AND gate 65 is concerned with the same problem. Suppose again that the counter 2 reaches 800 counting forward, and then reverses, but, before counting again changes state once more to count forward, all without altering the cumulative count of 800, it is then necessary to omit the next pulse. The AND gate 65 and the OR gate 69 are arranged so that when 800 is decoded, the bistable 66 is switched by forward and reverse signals so that it always lies in the correct state when the main counter leaves 800.

It will be appreciated that other embodiments of counters according to the present invention may be provided. For example, other combinations of capacities for the counters to omit the requisite number of pulses may be used to achieve accuracies of the same order. Also, the metric counter described with reference to FIG. 2 may be modified to count in inch units by the interposition of two switches, one before the OR gate 27 and another before the binary stage 11 to connect the latter to the output of the divider counter 29.

The same methods as are used to compensate for changes in atmospheric pressure may also be used to compensate for changes in other parameters, for example temperature.

The advantages of counters according to the present invention are that because corrections are achieved by omitting pulses from the count, it is possible to put a number of corrections in series, and they remain independent without the need for other than repetitive simple logic.

While the present invention has been described specifically in relation to the multiplication or division required in the conversion of distances from one unit to another, that is to say, from wavelength A units to inches, it will be appreciated that the invention is equally applicable in a general sense to the multiplication of a number $n$ by any member $q$ to produce the resulting value $p$, that is to say, $$n \times q = p$$
$$\therefore q = P/n$$
$$p \times q = n \times \frac{p}{n} = n\left(1 - \frac{n-p}{n}\right)$$

$$= n\left(1 - \frac{\frac{1}{n}}{n-p}\right)$$

From the foregoing it will also be appreciated that the invention in a general sense therefore resides in producing such multiplication by counting $n$ pulses and subtracting one pulse in every $r$ of these pulses, when $r$ is the nearest whole number greater than $n/n-p$. This procedure can be repeated indefinitely for various numbers as required.

We claim:

1. An electronic counter comprising:
   first counter means responsive to input pulses representative of one scale of measurement;
   a normally open gate receiving the input pulses;
   second counter means connected to the gate to receive the input pulses transmitted therethrough; and
   gate operating means connected to the gate and to the first counter means and effective to block the gate for the duration of one input pulse at predetermined intervals, determined by the counting of predetermined numbers of pulses in the first counting means, to modify the count recorded in the second counting means by a predetermined ratio, a predetermined proportion of the input pulses being omitted from the input to the second counter means;
   said first counter means including a plurality of stages, each of said stages being arranged to provide a separate correction to said input signals, the cumulative total of said corrections constituting the required modification of said input signals.

2. An interferometer counter for measuring the number of interference fringes produced by the movement of a target, comprising:
   decoding means producing input pulses representative of said fringes;
   first counter means connected to the decoding means to receive the input pulses therefrom;
   a normally open gate receiving the input pulses;
   second counter means connected to the gate to receive the input pulses transmitted therethrough;
   gate operating means connected to the gate and to the first counter means and effective to block the gate for the duration of one input pulse at predetermined intervals, determined by the counting of predetermined numbers of pulses in the first counting means, to modify the count recorded in the second counting means by a predetermined ratio, a predetermined proportion of the input pulses being omitted from the input to the second counter means; and
   said decoding means being connected to a NAND gate, the output of which controls the operation of said normally open gate.

3. An interferometer counter for measuring the number of interference fringes produced by the movement of a target, comprising:
   decoding means producing input pulses representative of said fringes;
   first counter means connected to the decoding means, to receive the input pulses therefrom;
   a normally open gate receiving the input pulses;
   second counter means connected to the gate to receive the input pulses transmitted therethrough;
   gate operating means connected to the gate and to the first counter means and effective to block the gate for the duration of one input pulse at predetermined intervals, determined by the counting of predetermined numbers of pulses in the first counting means, to modify the count recorded in the second counting means by a predetermined ratio, a predetermined proportion of the input pulses being omitted from the input to the second counter means, to give an output in terms of a given scale of measurement;
   circuit means for modifying the input to said second counter means so that the output of said second counter means provides a reading in a further scale of measurement; and
   said circuit means including; at least one counter means receiving said modified signal and connected to at least two further counter means arranged in parallel, the output of said counter means being taken through suitable delay lines to an OR gate in the input to said second counter means.